United States Patent [19]
Schoen et al.

[11] Patent Number: 6,045,146
[45] Date of Patent: Apr. 4, 2000

[54] VEHICLE SUSPENSION SYSTEM INCLUDING ARCUATE TORSION MEMBER

[75] Inventors: Robert M. Schoen, West Bloomfield; Kenneth S. Deneau, Troy, both of Mich.

[73] Assignee: Chrysler Corporation, Auburn Hills, Mich.

[21] Appl. No.: 09/082,988

[22] Filed: May 22, 1998

[51] Int. Cl.⁷ .................................................. B60G 11/99
[52] U.S. Cl. .......................... 280/124.166; 280/124.106
[58] Field of Search ..................... 280/124.166, 124.167, 280/124.106

[56] References Cited

U.S. PATENT DOCUMENTS

| | | | |
|---|---|---|---|
| 3,086,793 | 4/1963 | Kozicki | 280/124.167 |
| 3,722,908 | 3/1973 | Whitley, Jr. | 280/124.166 |
| 4,637,628 | 1/1987 | Perkins | 280/689 |
| 5,813,691 | 9/1998 | Aoki et al. | 280/124.166 |

*Primary Examiner*—Kenneth R. Rice
*Attorney, Agent, or Firm*—James R. Yee

[57] ABSTRACT

A suspension system for a motor vehicle includes a torsion member having a generally arcuate longitudinal axis. The suspension system further includes first and second control arms operatively interconnecting first and second vehicle wheels with a frame. The first and second control arms are mounted to the frame for pivotally movement. The torsion member directly connects the first and second control arms and is operative to selectively transfer torque therebetween in response to vertical displacement of the first and second wheels. When the first and second wheels are vertically displaced in unison, no torque is transferred between the control arms and the torsion member merely rotates about its generally arcuate longitudinal axis. When a difference in vertical displacement of the first and second wheels exist, for example, during cornering of the vehicle, each control arm would input opposite rotation in the torsion member, thereby generating a resisting torque.

20 Claims, 3 Drawing Sheets

VEHICLE SUSPENSION SYSTEM INCLUDING ARCUATE TORSION MEMBER

BACKGROUND OF THE INVENTION

1. Technical Field

The present invention generally relates to suspension systems for motor vehicles. More particularly, the present invention relates to a motor vehicle suspension system including an arcuate torsion member.

2. Discussion

Conventional motor vehicles are provided with independent suspension systems for absorbing impulsive forces generated by the contact of the wheels with irregular road surfaces and other vibrations while providing a smooth and comfortable ride for the vehicle occupants. In suspension systems of this type, a torsion bar assembly is often used to increase the roll rigidity and improve the steering stability of the vehicle. As shown in the prior art arrangement illustrated in FIG. 1, typical torsion bar assemblies A include a rod-shaped member having an elongated central segment B oriented to extend laterally across the vehicle and a pair of trailing arm segments C extending longitudinally at each end of the central segment B. The central segment B of the torsion bar assembly A is supported for rotation about its axis by one or more mounting brackets D which are affixed to a vehicle body or frame E. The distal end of each trailing arm segment C is operatively coupled to one of the vehicle wheels F for vertical movement therewith.

When the vehicle is subjected to a lateral rolling force as, for example, while the vehicle negotiates a turn, the trailing arm segments C pivot in opposite directions with respect to the axis of the central segment B. As a result, torsional reaction forces are generated which act through the trailing arm segments C to urge the wheels F to move toward their normal positions. Thus, the vehicle will be prevented from excessive rolling or leaning to either side by the torsional resistance produced by the torsion bar assembly A.

One known vehicle suspension system incorporating a torsion bar is shown and described in detail in commonly assigned U.S. Pat. No. 4,637,628. The '628 patent is specifically directed to an anti-roll torsion bar arrangement for a vehicle rear suspension. A rear axle beam assembly for the suspension system includes a tubular member extending transversely between the vehicle's rear wheels. A pair of first and second outer sleeves, each fixed to the rearward end of a trailing arm, co-eccentrically surround the respective outboard end portions of the tubular member. The first sleeve is fixedly attached to one end portion of the tubular member while the second sleeve is journally mounted on the other end portion of the tubular member. A pair of first and second wheel support castings each having a collar portion defining an axially bore fixedly receiving therein the outer end of an associated outer sleeve. An anti-roll torsion bore is axially positioned in the journalled second sleeve end portion of the tubular member. The torsion bar includes a head plate on its outboard end fastened to its associated second casting with the bar's inboard end pinned to the tubular member, thereby maintaining the dimensional relationship between the left and right castings. The tubular member other end portion may rotate relative to the second sleeve upon opposite pivotal movement of the trailing arms, thereby twisting the torsion bar and increasing the roll stiffness of the suspension system. U.S. Pat. No. 4,637,628 is hereby incorporated by reference as if fully set forth herein.

Conventional torsion bars, such as the one described in U.S. Pat. No. 4,637,628, operate to convert vertical motion of the vehicle wheel and associated linkage into torsion through a moment arm in bending. To be efficient, the attachment of a torsion bar of a convention torsion bar assembly to the control arm assembly must be spaced apart as far as possible from the rotational axis of the longitudinally extending member (e.g., trailing arm or control arm) so as to obtain maximum vertical deflection (e.g., applied moment). This requirement often imposes packaging restrictions. Thus, it is desirable to provide a torsion member for a motor vehicle suspension system which reduces packaging restrictions and improves operational efficiency.

SUMMARY OF THE INVENTION

It is a general object of the present invention to provide a torsion bar for a vehicle suspension system which functions independently from an attachment moment arm location.

It is another object of the present invention to provide a torsion member for a motor vehicle suspension system which reduces packaging restrictions and improves operational efficiency.

It is a more specific object of the present invention to provide a flexible torsion member for a motor vehicle suspension system having an arcuate shape with first and second ends attached to suspension control arms associated with a pair of wheels.

In one form, the present invention provides a suspension system for a motor vehicle including a frame and a pair of wheels. The suspension system includes first and second control arms operatively interconnecting the frame with a first wheel and a second wheel of the pair of wheels, respectively. Both of the first and second control arms are attached to the frame for pivotal movement in response to vertical displacement of an associated one of the first and second wheels. The suspension system further includes a torsion member having a generally arcuate longitudinal axis. The torsion member connects the first and second control arms such that the torsion member rotates about the generally arcuate longitudinal axis when the pair of wheels are vertically displaced in unison and torsion is applied along the generally arcuate longitudinal axis when vertical displacement of the pair of wheels is not in unison.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
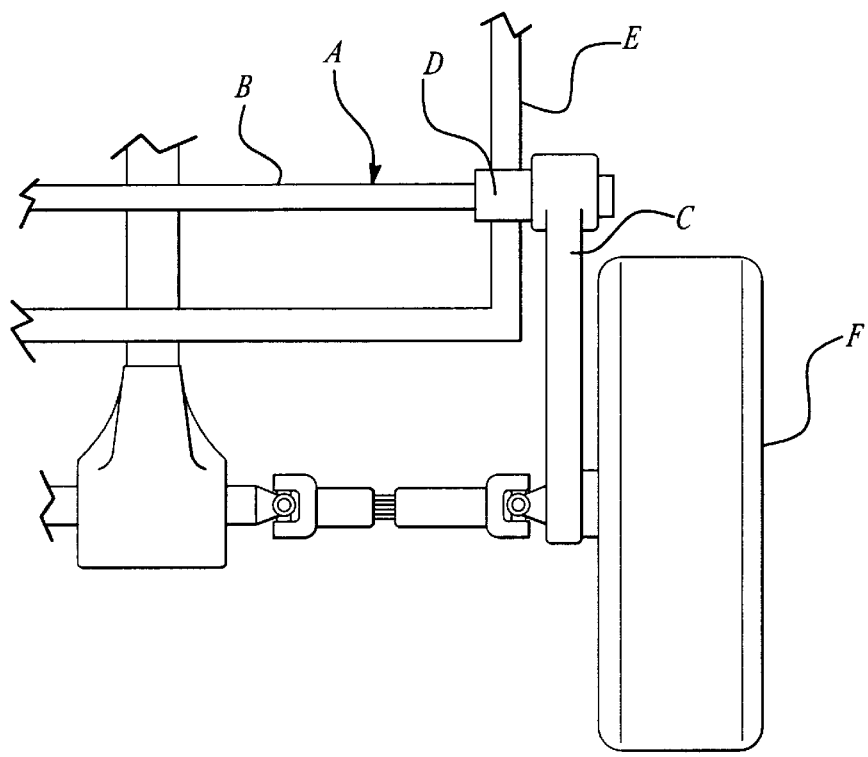
FIG. 1 is a simplified view of a portion of a prior art suspension arrangement for a motor vehicle illustrating a conventional torsion bar for reacting loads in torsion.
Figure 2:
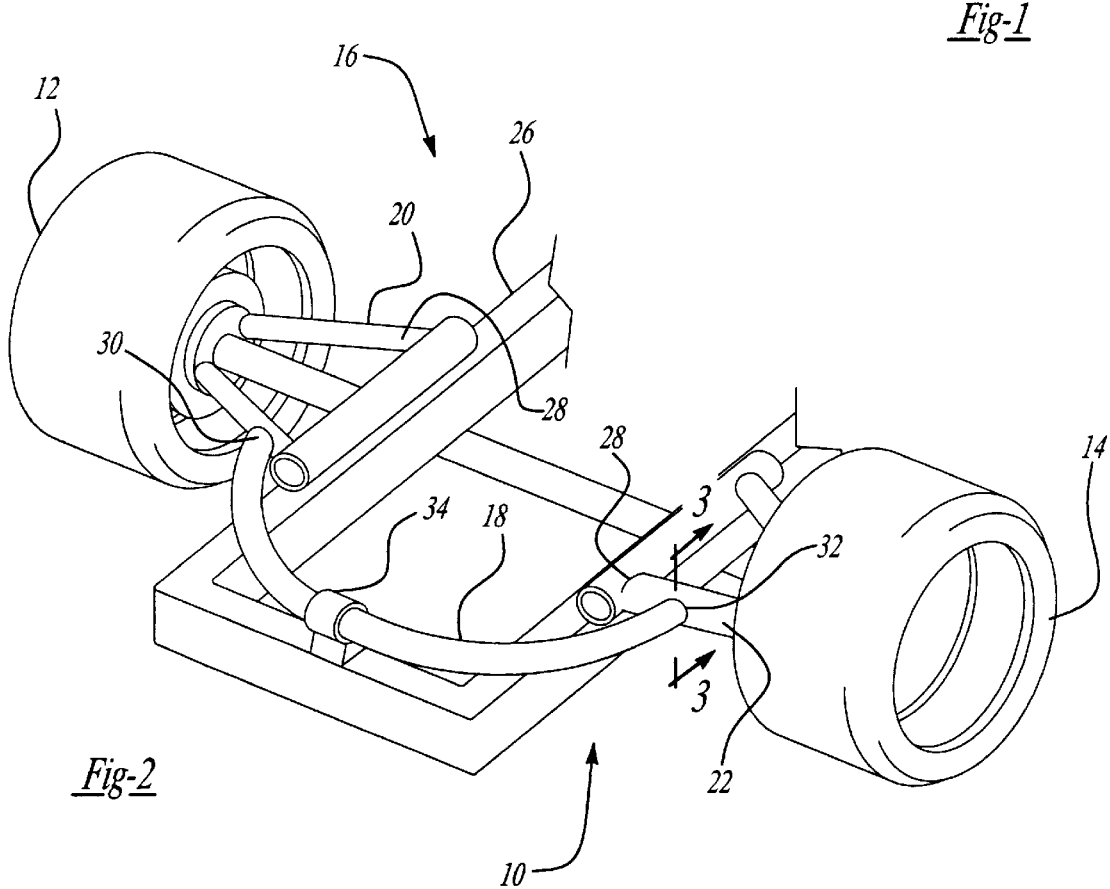
FIG. 2 is a schematic illustration of a suspension system for a motor vehicle constructed in accordance with the teachings of a preferred embodiment of the present invention, the suspension system shown specifically associated with the rear wheels of a motor vehicle.

Turning first to the schematic illustration of FIG. 2, a suspension system constructed in accordance with the teachings of a preferred embodiment of the present invention is generally identified at reference numeral 10. The suspension system 10 is shown in FIG. 2 specifically adapted for use with first and second rear wheels 12 and 14 of a motor vehicle for absorbing impulse forces generated by the contact of the wheels 12 and 14 with irregular road surfaces and providing a smooth and comfortable ride for the vehicle occupants. However, it will be apparent below, to those skilled in the art, that the teachings of the present invention are equally applicable for the front wheels (not specifically shown) of a motor vehicle.

While broadly directed to a suspension system 10 for a motor vehicle 16, the primary focus of the present invention is directed to a torsion member and its operative coupling to the remainder of the vehicle suspension 10 which is otherwise of conventional construction. The torsion member is identified in the drawings at reference numeral 18. Prior to addressing the construction and operation of the torsion member 18, a brief understanding of the remaining components of the suspension 10 is warranted.

With continued reference to FIG. 2, the suspension 10 is conventionally illustrated to generally include first and second control arms 20 and 22. The first and second control arms 20 and 22 operatively interconnect the first and second wheels 12 and 14 with a frame 26 of the vehicle 16, respectively. Each of the control arms 20 and 22 is shown to be pivotally attached to the frame through a pair of mounting brackets 28 for rotation about a pivot axis parallel to a longitudinal axis of the vehicle 16.

The torsion member 18 of the present invention is preferably shown directly interconnecting the first and second control arms 20 and 22. As illustrated, the torsion member has a generally arcuate longitudinal axis and first and second ends 30 and 32 attached to the first and second control arms 20 and 22, respectively. A mounting bracket 34 rotatably interconnects the torsion member 18 to the frame 26 of the vehicle 16.

In response to vertical travel of the associated wheel 12 or 14, the control arms 20 and 22 pivot relative to the frame 26 of the vehicle 16. When both wheels 12 and 14 travel in unison, the torsion member 18 rotates about its generally arcuate longitudinal axis and does not transfer torque between the first and second control arms 20 and 22. When a difference exists between the vertical travel of the wheels 12 and 14, for example, during cornering, the control arms 20 and 22 would input opposite rotation into the torsion member generating a resisting torque.

Figure 6:
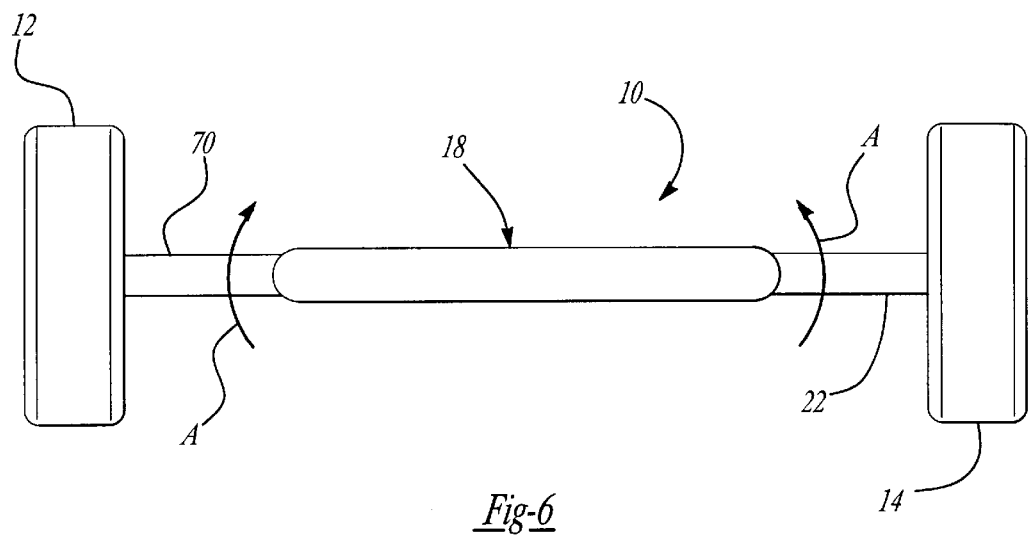
FIGS. 6 and 7 are simplified end views of the suspension of the present invention.
Figure 7:
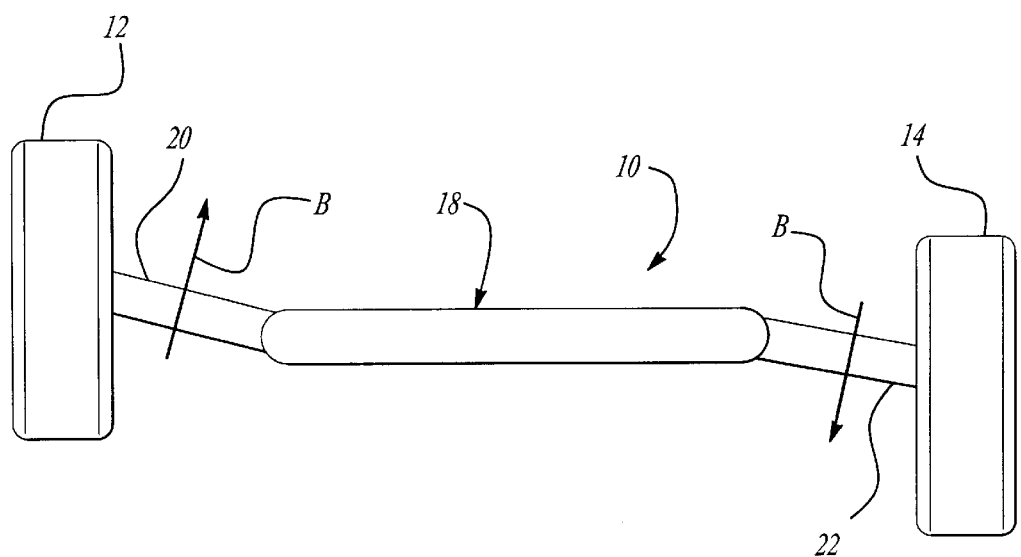

FIG. 6 represents a simplified rear view of the suspension system 10 of the present invention as the wheels 12 and 14 are vertically displaced in unison. The arrows A identify upward vertical displacement of the wheels 12 and 14 in response to a dip in the road surface, for example. Similarly, FIG. 7 illustrates the suspension system 10 when a difference in vertical displacement of the wheels 12 and 14 exist, for example, during cornering. The arrows B indicate the direction of rotation for the control arms 20 and 22.

Figure 5:
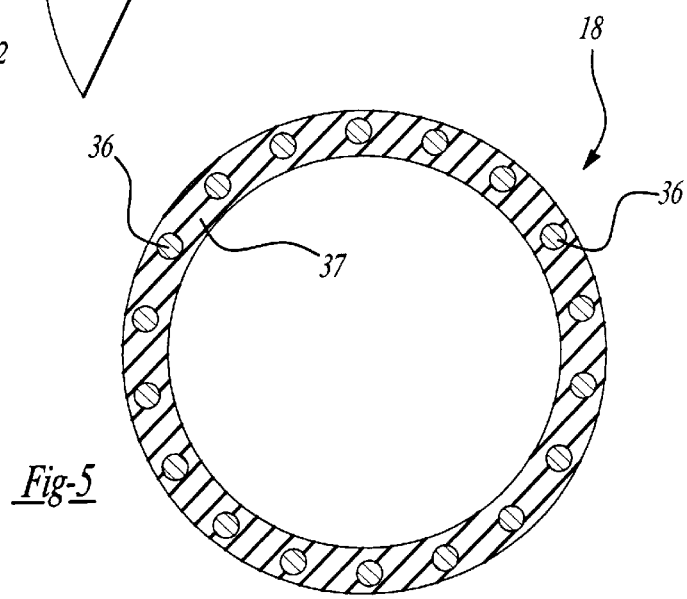
FIG. 5 is a cross-sectional view taken along the line 5—5 of FIG. 3.

With reference to the cross-sectional view of FIG. 5, the torsion member 18 is shown to have a generally circular cross-section. In the preferred embodiment, the torsion member 18 is hollow and constructed from a plurality of stainless steel wire braids 36 which are diagonally braided. A solid torsion member may also work if made of the appropriate material. The wire braids 36 are encased in vulcanize rubber 37 or a similar performing material to prevent hose collapse during bending and torsion and to provide an inherent elasticity between wire strands 36 that will respond under load. It will be appreciated by those skilled in the art that the wire gauge of the wire braids 36 and the dimensions of the inner and outer diameters, braid spacing, rubber durometer and other specific details are strictly a matter of design choice which can easily be changed for particular applications. Furthermore, it will be appreciated by those skilled in the art that such parameters can be optimized to tune the suspension system 10 of the present invention to specific load characteristics.

Figure 3:
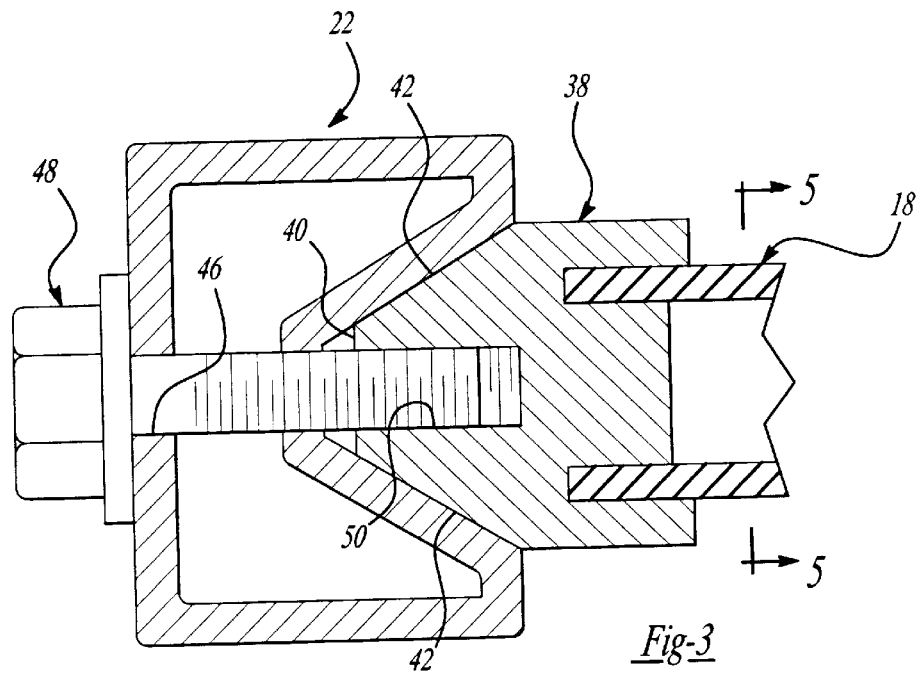
FIG. 3 is a fragmentary and simplified cross-sectional view illustrating attachment of the torsion member of the present invention to the suspension control arm.
Figure 4:
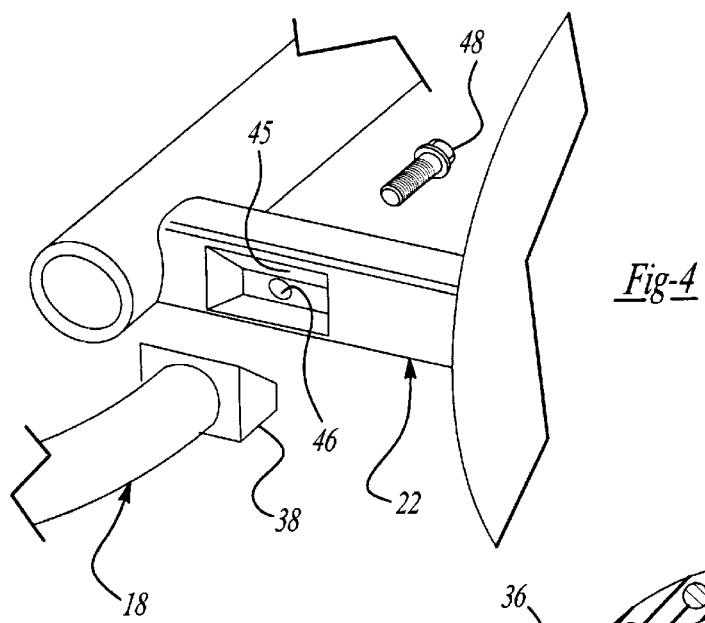
FIG. 4 is a fragmentary perspective view of the torsion member and suspension control arm of FIG. 3 shown partially exploded for purposes of illustration.

Turning to FIGS. 3 and 4, a preferred manner of attaching the torsion member 18 to the second control arm 22 is illustrated. It will be understood by those skilled in the art that attachment of the torsion member 18 to the first control arm 20 may be accomplished in a substantially identical manner. As illustrated, an end fitting 38 is fixedly attached to the first end 32 of the torsion member 18 in any suitable manner. In the exemplary embodiment illustrated, the end fitting 38 is preferably shown to include a planar leading surface 40 surrounded by a plurality of angled side surfaces 42. The leading surface 40 and side surfaces 42 are matingly received by an aperture 44 provided in the control arm 22. An aperture 46 is provided in the control arm 22 which intersects the recess 44. The aperture 46 is adapted to receive a threaded fastener 48 which passes therethrough and engages an internally threaded aperture 50 provided in the end fitting 38. The angled side surfaces 42 of the end fitting 38 assist in guiding the end fiting 38 into the recess 44 and further function to prevents rotation of the end fitting 38 relative to the control arm 22 with a single fastener 48.

While the above description constitutes the preferred embodiment of the invention, it will be appreciated that the invention is susceptible to modification, variation, and change without departing from the proper scope or fair meaning of the accompanying claims.

We claim:

1. A suspension system in combination with a motor vehicle including a frame, a front pair of wheels and a rear pair of wheels, the suspension system comprising:

first and second control arms operatively interconnecting the frame with a first wheel and a second wheel of one of the front and rear pairs of wheels, respectively, both of said first and control arms being attached to said frame for pivotal movement in response to vertical displacement of an associate one of the first and second wheels; and a torsion member having a generally arcuate longitudinal axis in a generally horizontal plane, said torsion member connecting said first and second control arms such that said torsion member rotates about said generally arcuate longitudinal axis when the pair of wheels are vertically displaced in unison and torsion is applied along said generally arcuate longitudinal axis when vertical displacement of said one of said front and rear pairs of wheels is not in unison.

2. The suspension system for a motor vehicle of claim 1, wherein said torsion member directly connects said first and second control arms.

3. The suspension system for a motor vehicle of claim 2, wherein said torsion member is flexible.

4. The suspension system for a motor vehicle of claim 1, wherein said torsion member is attached to the frame for rotation about said generally arcuate longitudinal axis.

5. The suspension system for a motor vehicle of claim 1, wherein said torsion member has a generally circular cross-section.

6. The suspension system for a motor vehicle of claim 1, wherein said torsion member comprises a braided steel hose.

7. A suspension system in combination with a motor vehicle including a frame, a front pair of wheels and a rear pair of wheels, the suspension system comprising:

first and second control arms operatively interconnecting the frame with a first wheel and a second wheel of one of the front and rear pairs of wheels, respectively, both of said first and control arms being attached to the frame for pivotal movement in response to vertical displacement of an associate one of the first and second wheels; and a torsion member having a first end interconnected to said first control arm and a second end interconnected to said second control arm, said torsion member being generally cylindrical and having an arcuate longitudinal axis in a generally horizontal plane, said torsion member operative to selectively transfer torque between said first and second control arms in response to vertical displacement of said first and second wheels.

8. The suspension system for a motor vehicle of claim 7, wherein said torsion member directly connects said first and second control arms.

9. The suspension system for a motor vehicle of claim 8, wherein said torsion member is operative to transfer torque between said first and second control arms in response to a difference in vertical travel between the first and second wheels.

10. The suspension system for a motor vehicle of claim 9, wherein said torsion member rotates about its arcuate longitudinal axis in response to common vertical displacement of the first and second wheels.

11. The suspension system for a motor vehicle of claim 7, wherein said torsion member is flexible.

12. The suspension system for a motor vehicle of claim 7, wherein said torsion member is rotatably interconnected to the frame.

13. The suspension system for a motor vehicle of claim 7, wherein said intermediate portion is a braided steel hose.

14. A motor vehicle comprising:

a frame;

first and second front wheels;

first and second control arms operatively and connecting the frame with said first and second front wheels, respectively, said first and second control arms each being attached to said frame for pivotal movement in response to vertical displacement of an associated one of the first and second front wheels; and a torsion member having a first end interconnected to said first control arm and a second end interconnected to said second control arm, said torsion member being generally cylindrical and having an arcuate longitudinal axis in a generally horizontal plane, said torsion member operative to selectively transfer torque between said first and second control arms in response to vertical displacement of said first and second front wheels.

15. The a motor vehicle of claim 14, wherein said torsion member directly connects said first and second control arms.

16. The motor vehicle of claim 15, wherein said torsion member is operative to transfer torque between said first and second control arms in response to a difference in vertical travel between the first and second front wheels.

17. The motor vehicle of claim 16, wherein said torsion member rotates about its arcuate longitudinal axis in response to common vertical displacement of the first and second wheels.

18. The motor vehicle of claim 14, wherein said torsion member is flexible.

19. The motor vehicle of claim 14, wherein said torsion member is rotatably interconnected to the frame.

20. The motor vehicle of claim 14, wherein said intermediate portion is a braided steel hose.

\* \* \* \* \*